(12) United States Patent
Hamaie et al.

(10) Patent No.: US 8,752,077 B2
(45) Date of Patent: Jun. 10, 2014

(54) OPTICAL DISC APPARATUS

(75) Inventors: Seiji Hamaie, Kawasaki (JP); Koji Matsumoto, Kuala Lumpur (ML); Hideyuki Nagamine, Urayasu (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 51 days.

(21) Appl. No.: 13/523,369

(22) Filed: Jun. 14, 2012

(65) Prior Publication Data

US 2012/0331491 A1 Dec. 27, 2012

(30) Foreign Application Priority Data

Jun. 23, 2011 (JP) ................................. 2011-139377

(51) Int. Cl.
*G11B 17/03* (2006.01)

(52) U.S. Cl.
USPC ........... 720/655; 720/600; 720/601; 720/610; 720/657

(58) Field of Classification Search
USPC .......................... 720/600–601, 610, 655, 657
See application file for complete search history.

(56) References Cited

U.S. PATENT DOCUMENTS

| | | | | |
|---|---|---|---|---|
| 5,208,734 | A * | 5/1993 | Someno | 361/706 |
| 5,359,587 | A * | 10/1994 | Uehara | 720/600 |
| 5,536,917 | A * | 7/1996 | Suppelsa et al. | 219/201 |
| 6,043,992 | A * | 3/2000 | Scheibler | 361/818 |
| 6,837,554 | B2 * | 1/2005 | Yamamoto et al. | 312/223.2 |
| 2003/0111942 | A1 * | 6/2003 | Judge et al. | 312/334.46 |
| 2010/0281493 | A1 * | 11/2010 | Tsai et al. | 720/601 |

FOREIGN PATENT DOCUMENTS

JP 2009-64536 3/2009

* cited by examiner

*Primary Examiner* — Wayne Young
*Assistant Examiner* — Carlos E Garcia
(74) *Attorney, Agent, or Firm* — Antonelli, Terry, Stout & Kraus, LLP.

(57) ABSTRACT

An example of an optical disc apparatus includes a top case and a bottom case. The top case includes a tab extending downward from one end of the top case. The tab includes a protrusion protruding inward. The bottom case includes a lower-side folded portion formed by folding inward an upper end of one side surface of the bottom case. The lower-side folded portion includes a cantilever spring. The cantilever spring includes a spring portion extending in a vertical direction and a curved portion formed by folding inward an upper part of the spring portion. The protrusion comes into contact with the curved portion when the top case is being affixed to the bottom case and is in contact with the spring portion under a state where the top case is affixed to the bottom case.

4 Claims, 7 Drawing Sheets

OPTICAL DISC APPARATUS

CLAIM OF PRIORITY

The present application claims priority from Japanese patent application JP2011-139377 filed on Jun. 23, 2011, the content of which is hereby incorporated by reference into this application.

BACKGROUND OF THE INVENTION

This invention relates to an optical disc apparatus, and more particularly, to a structure of a case assembly for housing a tray.

An optical disc apparatus that reads and writes information with respect to (from and to) an optical disc such as a compact disc (CD), a digital versatile disc (DVD), or a Blu-ray disc (BD) includes an optical pickup unit (hereinafter, referred to as "OPU") that reads and writes data with respect to an optical disc with laser light, a tray which supports the OPU and in which an optical disc is mountable, and a case assembly that slidably houses the tray.

The case assembly is constructed by affixing assembling a top case for covering the upper surface of the tray and a bottom case for covering the side surface and the lower surface of the tray.

In order to enhance an assembling property of the top case and the bottom case and to reduce sound leakage, electromagnetic interference (EMI), and electrostatic discharge (ESD), it is important to eliminate fitting backlash between the bottom case and the top case.

However, if an attempt is made to eliminate the fitting backlash only by adjusting mating between the bottom case and the top case, the processing accuracy required for each case increases, which is disadvantageous in terms of cost.

Japanese Patent Application Laid-open No. 2009-64536 discloses a configuration that eliminates fitting backlash by forming a cantilever spring on one case and a protrusion on the other case and engaging the cases with each other during assembly.

However, with this configuration, the resistance which an operator receives when affixing the top case to the bottom case depends upon the force of the cantilever spring, and hence, it is difficult to perform adjustment so as to obtain appropriate feeling of resistance.

SUMMARY OF THE INVENTION

It is an object of this invention to provide an optical disc apparatus that is excellent in an affixing property of a top case that is capable of reducing sound leakage, EMI, and ESD.

An exemplary embodiment of this invention is an optical disc apparatus including a tray on which an optical disc is mountable and a case assembly for housing the tray. The case assembly includes a top case for covering an upper surface of the tray and a bottom case for covering a lower surface of the tray. The top case includes a tab that extends downward from one end of the top case along one side surface of the tray. The tab includes a protrusion that protrudes inward. The bottom case includes a lower-side folded portion formed by folding inward an upper end of one side surface of the bottom case. The lower-side folded portion includes a cantilever spring. The cantilever spring includes a spring portion and a curved portion. The spring portion extends in a vertical direction along the one side surface of the tray and the protrusion of the tab is in contact with the spring portion under a state in which the top case is affixed to the bottom case. The curved portion is formed by folding inward an upper part of the spring portion and the protrusion comes into contact with the curved portion when the top case is being affixed to the bottom case.

According the exemplary embodiment of this invention, appropriate feeling of resistance is obtained due to the reaction force generated when the protrusion climbs over the curved portion of the cantilever spring, and thus the affixing property of the top case is enhanced. The reaction force depends upon the height of the protrusion, and the feeling of resistance can be adjusted to an intended magnitude easily and accurately.

After the protrusion climbs over the curved portion, a force acts on the protrusion from the spring portion, and the fitting backlash between the top case and the bottom case is eliminated. Accordingly, sound leakage, EMI, and ESD can be reduced.

The above and other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE PREFERRED EMBODIMENT

Hereinafter, an embodiment of this invention is described with reference to the accompanying drawings.

Figure 1:
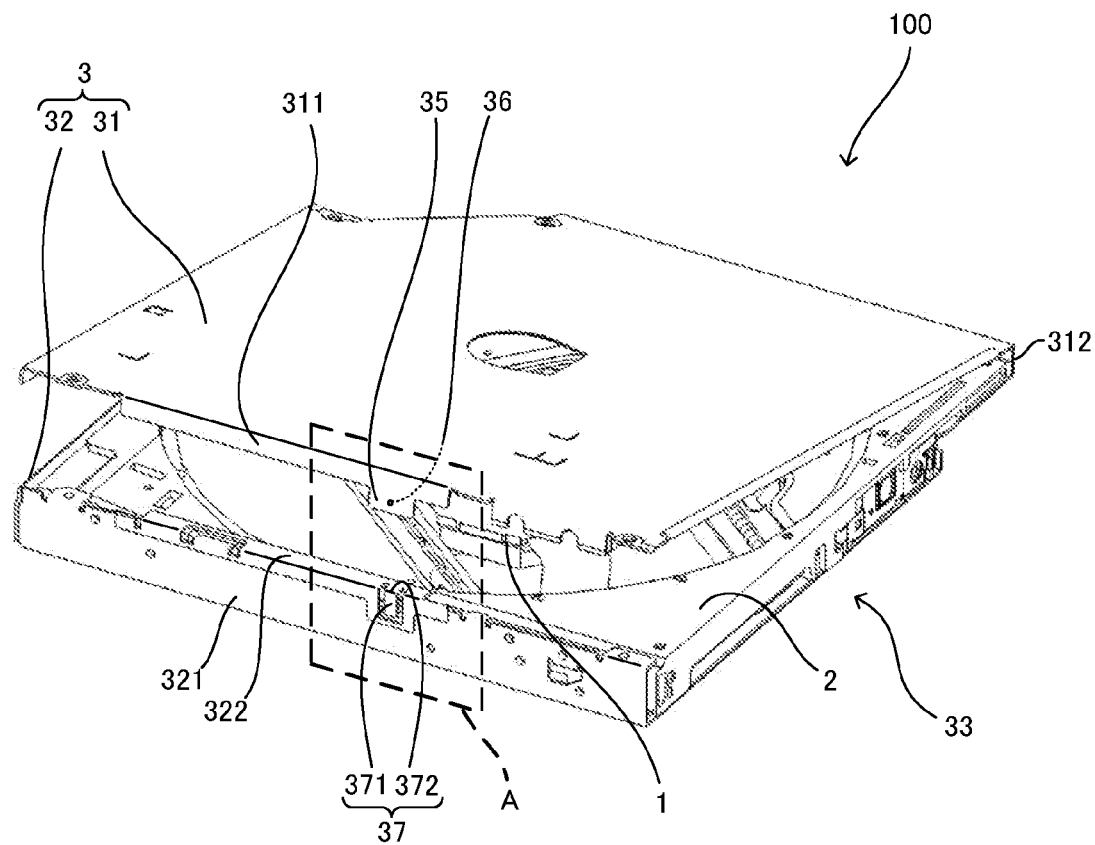
FIG. 1 is a perspective view of an optical disc apparatus according to an embodiment of this invention.
Figure 2:
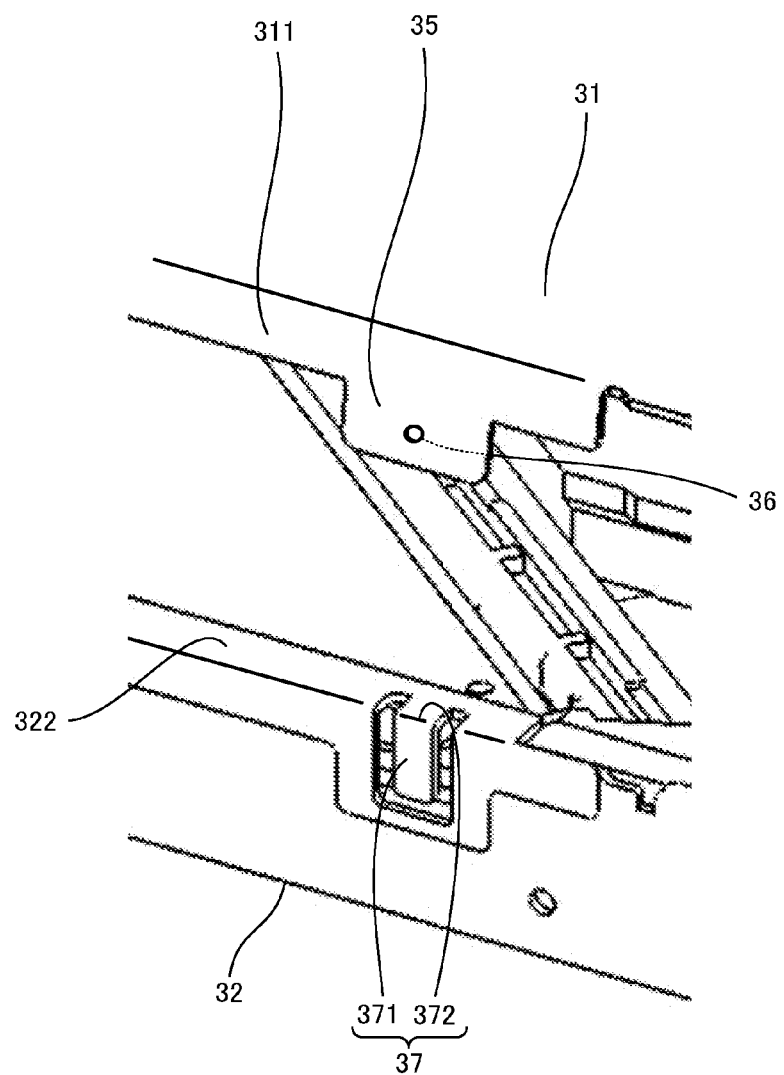
FIG. 2 is a partially enlarged view of FIG. 1.
Figure 3:
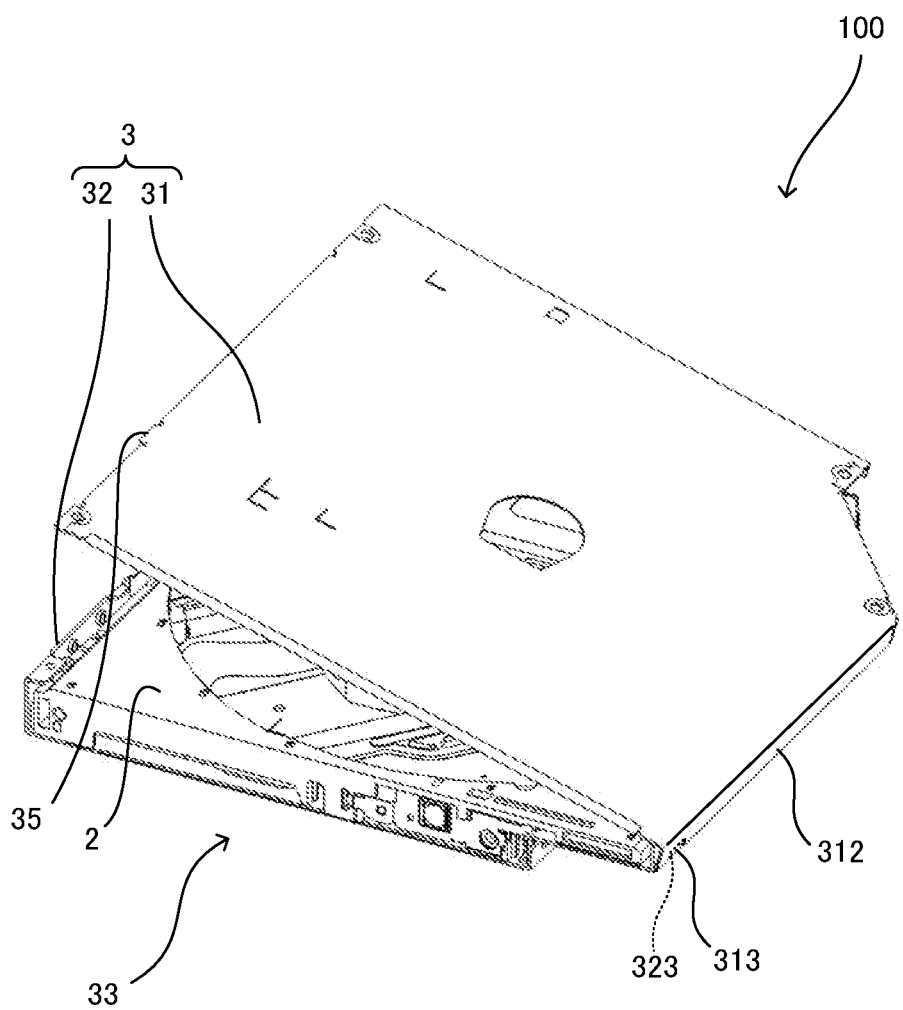
FIG. 3 is a perspective view of the optical disc apparatus of FIG. 1 viewed from an opposite side thereof.

FIG. 1 is a perspective view of an optical disc apparatus 100 according to the embodiment of this invention. FIG. 2 is a partially enlarged view illustrating a portion surrounded by a frame A of FIG. 1 in an enlarged state. FIG. 3 is a perspective view of the optical disc apparatus 100 of FIG. 1 viewed from an opposite side thereof. In each of the FIGS. 1 to 3, a top case 31 is opened so that the internal structure of the optical disc apparatus 100 can be understood.

The optical disc apparatus 100 includes an optical pickup unit (hereinafter, referred to as "OPU") 1, a tray 2 on which an optical disc is mountable, and a case assembly 3 for housing the tray 2.

The OPU 1 is a mechanism that reads and writes data with respect to the optical disc through use of laser light. The OPU 1 is supported by the tray 2 so as to be movable in a radial direction of the optical disc.

The case assembly 3 includes the plate-shaped top case 31 for covering the upper surface of the tray 2 and a bottom case 32 for covering the side surface and the lower surface of the tray 2. The bottom case 32 has a box shape in which the upper side and the right side thereof in FIG. 1 are opened. When the top case 31 is affixed to the bottom case 32, an opening portion 33 is formed on the right side of FIG. 1.

The tray 2 can slide along two rails (not shown) arranged in the case assembly 3. When the tray 2 slides to the right side of FIG. 1, the tray 2 can move out of the case assembly 3 through the opening portion 33. A bezel (face panel) (not shown) is fitted to the right side of the tray 2.

The top case 31 includes an upper-side folded portion 311 that extends downward from one end of the top case 31 along one side surface of the tray 2, a side surface 312 that extends downward from another end of the top case 31 along another side surface of the tray 2, and, as illustrated in FIG. 3, a claw portion 313 that extends inward from the side surface 312.

The upper-side folded portion 311 has a tab 35 that extends further downward at a position opposed to the widthwise center (preferably, a position obtained by bisecting the widthwise dimension) of the side surface 312. A cylindrical protrusion 36 protruding inward is formed on the inner surface of the tab 35. The protrusion 36 is formed by press forming or the like. For example, the claw portion 313 and the tab 35 are formed on the sides opposite to each other.

The bottom case 32 includes a lower-side folded portion 322 that is formed by folding inward the upper end of one side surface 321 of the bottom case 32, and, as illustrated in FIG. 3, a cutaway portion 323 which is opened on another side surface of the bottom case 32 and with which the claw portion 313 is engageable. For example, the side surface where the cutaway portion 323 is formed is opposite to the side surface where the lower-side folded portion 322 is formed.

The lower-side folded portion 322 includes a cantilever spring 37 at a position corresponding to the protrusion 36. The cantilever spring 37 is an L-shaped spring including a spring portion 371, which extends in a vertical direction along the side surface of the tray 2 and on which the protrusion 36 is abuttable, and a curved portion 372, which is formed by folding inward an upper part of the spring portion 371 and which is connected to the lower-side folded portion 322.

Next, a procedure of affixing the top case 31 to the bottom case 32 is described.

Figure 4A:
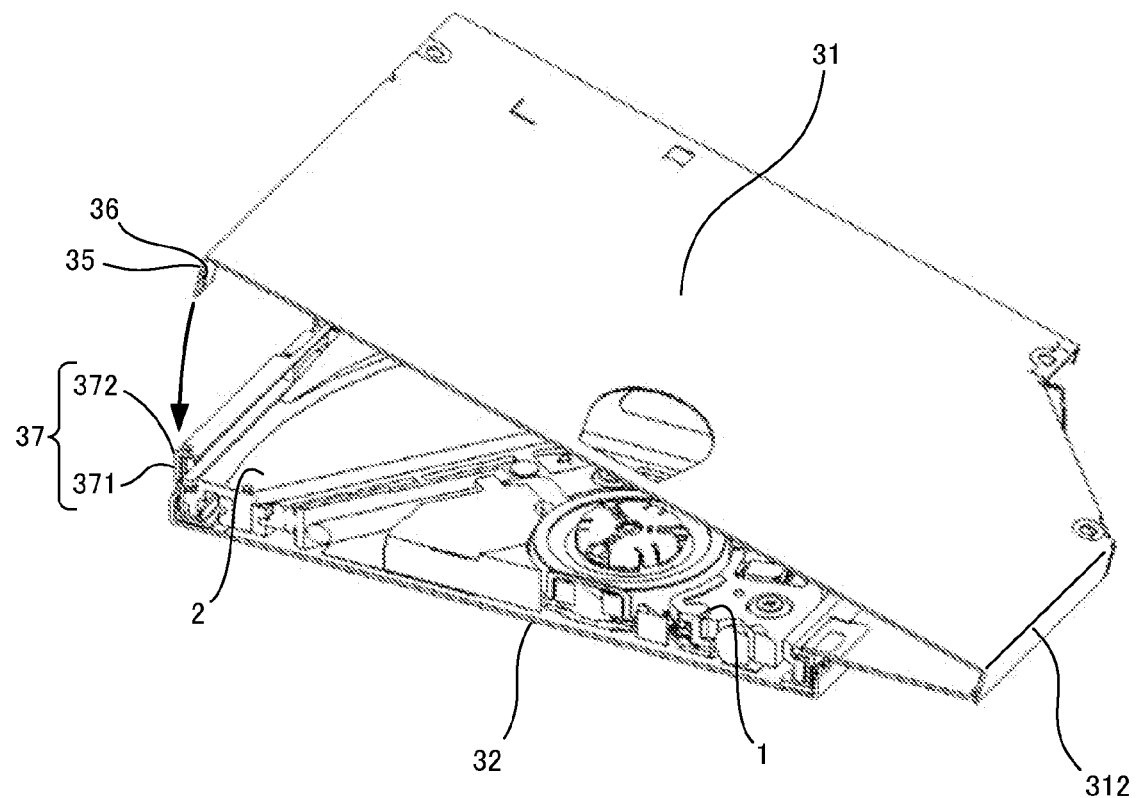
FIG. 4A is a view illustrating a method of affixing a top case.

First, as illustrated in FIG. 3, the claw portion 313 of the top case 31 is engaged with the cutaway portion 323 of the bottom case 32. FIG. 4A illustrates a side cross-section of this state taken along a line passing through the protrusion 36.

Figure 4B:
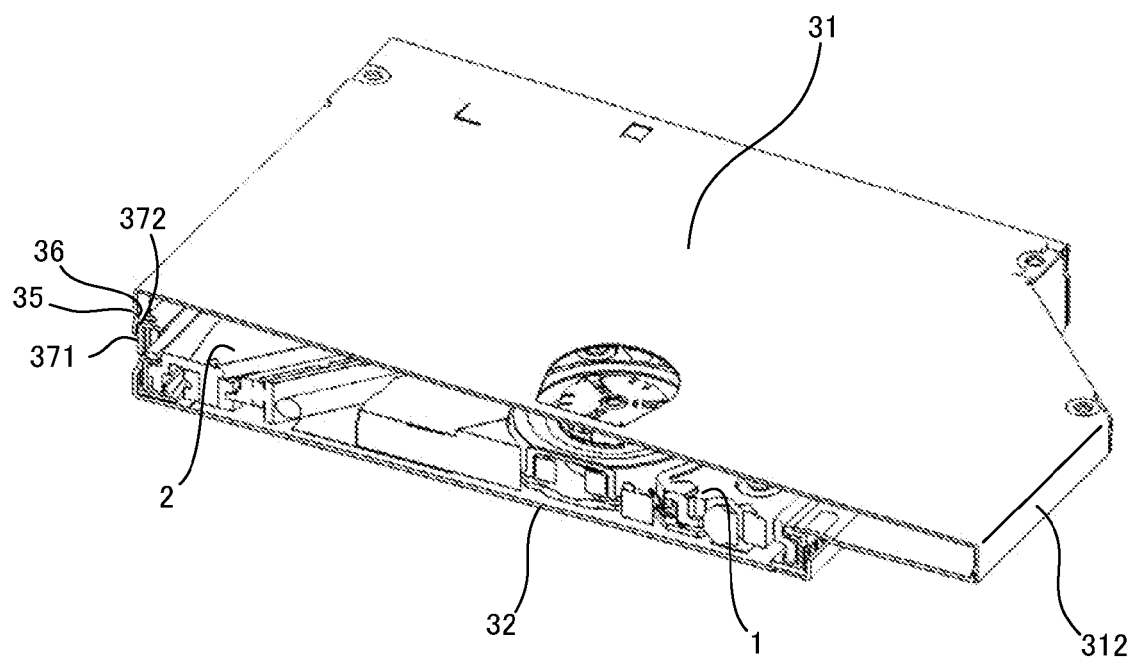
FIG. 4B is a view illustrating the method of affixing the top case.

Next, when the top case 31 is rotated about the engagement portion between the claw portion 313 and the cutaway portion 323, and the upper-side folded portion 311 and the tab 35 are moved closer to the lower-side folded portion 322, the protrusion 36 comes into contact with the curved portion 372 of the cantilever spring 37 as illustrated in FIG. 4B. When a downward force is further applied to the top case 31 in this state, a reaction force acts on the top case 31, and appropriate feeling of resistance is obtained when the protrusion 36 climbs over the curved portion 372.

Figure 5A:
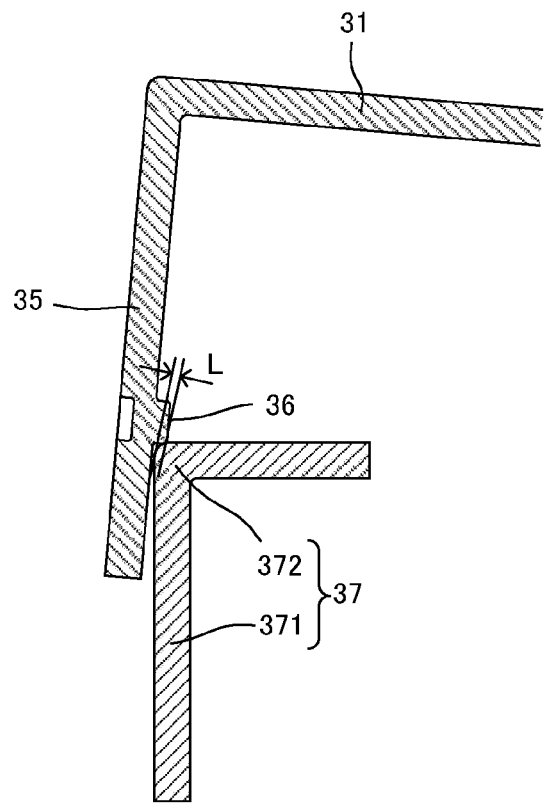
FIG. 5A is a view illustrating the method of affixing the top case.

FIG. 5A illustrates a state in which the protrusion 36 is brought into contact with the curved portion 372. A movement path of the protrusion 36 and the curved portion 372 overlap each other by the amount indicated by L in FIG. 5A. In order for the protrusion 36 to climb over the curved portion 372, it is necessary that the total deformation amount of the tab 35 and the cantilever spring 37 be equal to or more than L in a contact region between the protrusion 36 and the curved portion 372. Accordingly, an appropriate reaction force acts on the top case 31.

In order to adjust the magnitude of the reaction force, it is only necessary to adjust the height of the protrusion 36. The protrusion 36 can be formed to an intended height with relatively high accuracy by press forming or the like. Therefore, once the height of the protrusion 36 which can provide appropriate resistance is known, subsequently, the reaction force (feeling of resistance) can be adjusted to an intended magnitude easily and accurately by uniformly setting the height of the protrusion 36 to the height which can provide appropriate resistance.

The surface of the curved portion 372 is curved smoothly, and hence, no unnecessary stop is caused when the protrusion 36 climbs over the curved portion 372.

Figure 4C:
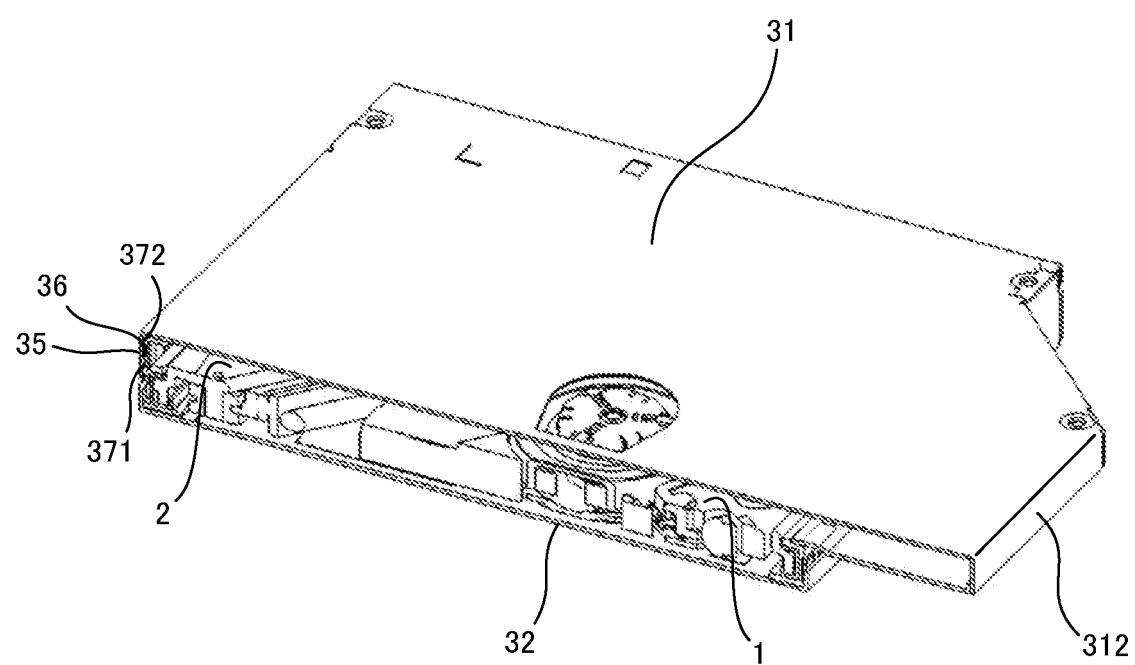
FIG. 4C is a view illustrating the method of affixing the top case.
Figure 5B:
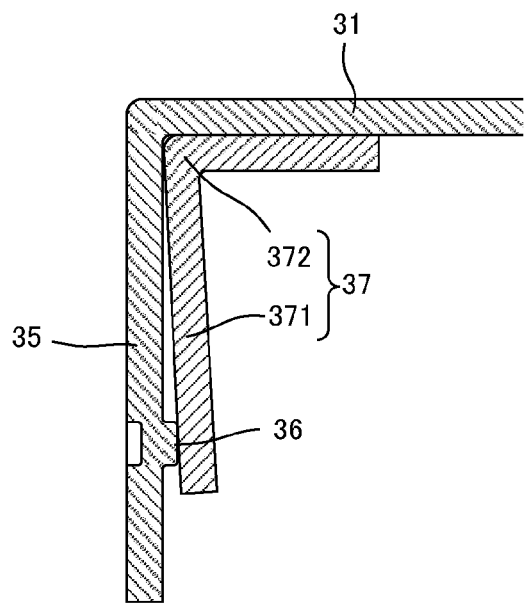
FIG. 5B is a view illustrating the method of affixing the top case.

When the protrusion 36 climbs over the curved portion 372, the top case 31 moves toward a closed position illustrated in FIGS. 4C and 5B.

The upper end of the cantilever spring 37 is connected to the lower-side folded portion 322 and the lower end thereof is a free end. Therefore, as the contact position between the protrusion 36 and the cantilever spring 37 is lowered, the force acting on the protrusion 36 becomes weaker, and thus the top case 31 can be moved smoothly to the closed position.

When the top case 31 is placed at the closed position, the lower-side folded portion 322 is covered with the upper-side folded portion 311, and the protrusion 36 is pressed outward by the cantilever spring 37. Accordingly, the fitting backlash between the top case 31 and the bottom case 32 is eliminated.

After that, the top case 31 is held stably at the closed position even if the operator does not hold the top case 31 with a hand. The reason for this is as follows. When the top case 31 tries to separate from the bottom case 32, the reaction force from the cantilever spring 37 increases. Further, in order to disengage the top case 31 from the bottom case 32, the protrusion 36 needs to climb over the curved portion 372. As a result, the top case 31 tries to stay at the closed position unless an external force is applied.

Next, functions and effects of this embodiment are described.

When the top case 31 is being affixed to the bottom case 32, first, the protrusion 36 comes into contact with the curved portion 372, and appropriate feeling of resistance is obtained by the resistance caused when the protrusion 36 climbs over the curved portion 372. The feeling of resistance is eliminated when the protrusion 36 has climbed over the curved portion 372, and hence, the operator can recognize that the top case 31 has been affixed to the bottom case 32 correctly.

The reaction force at a time of assembly is determined by the height of the protrusion 36, and the protrusion 36 formed by press forming or the like has high dimensional accuracy in the height direction thereof. Therefore, the feeling of resistance at a time of assembly can be adjusted to an intended magnitude easily and accurately.

When the protrusion 36 has climbed over the curved portion 372 and the top case 31 has moved to the closed position, the protrusion 36 is pressed outward by the cantilever spring 37, and hence the fitting backlash between the top case 31 and the bottom case 32 is eliminated.

Thus, according to this embodiment, sound leakage, EMI, and ESD can be reduced while the assembling property of the top case 31 and the bottom case 32 is enhanced.

Further, the cantilever spring 37 is a cantilever spring in which the curved portion 372 is connected to the lower-side folded portion 322 and the lower end is a free end, and hence, as described above, the top case 31 can be moved to the closed position smoothly. Further, when the top case 31 has moved to the closed position, the top case 31 becomes stable at that position, which also enhances the assembling property.

It should be noted that the spring portion 371 of the cantilever spring 37 may be connected to the side surface 321 of the bottom case 32, and the curved portion 372 may be a free end.

Further, the protrusion 36 and the cantilever spring 37 are provided at a position opposed to the widthwise center of the side surface 312 of the top case 31. Therefore, in the top case 31, a force is applied to the side surface 312 on the opposite side and the protrusion 36 with good balance, and a rotation moment is not generated. Accordingly, the posture of the top case 31 after assembling becomes stable.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical disc apparatus, comprising:
   a tray on which an optical disc is mountable; and
   a case assembly for housing the tray, the case assembly comprising:
   a top case for covering an upper surface of the tray; and
   a bottom case for covering a lower surface of the tray,
   wherein the top case comprises a tab that extends downward from a first end of the top case along a first side surface of the tray and includes a protrusion that protrudes inward,
   wherein the bottom case comprises a lower-side folded portion formed by folding inward an upper end of a first side surface of the bottom case, and
   wherein the lower-side folded portion comprises a cantilever spring, the cantilever spring comprising:
   a spring portion which extends in a vertical direction along the first side surface of the tray and with which the protrusion of the tab is in contact under a state in which the top case is affixed to the bottom case; and
   a curved portion which is formed by bending inward an upper part of the spring portion and with which the protrusion comes into contact when the top case is being affixed to the bottom case.

2. The optical disc apparatus according to claim 1,
   wherein the top case further comprises:
   a side surface that extends downward from a second end of the top case along a second side surface of the tray; and
   a claw portion that extends inward from the side surface of the top case, and
   wherein the bottom case further comprises a cutaway portion which is opened on a second side surface of the bottom case and with which the claw portion is engageable.

3. The optical disc apparatus according to claim 1, wherein the curved portion of the cantilever spring is connected to the lower-side folded portion and a lower end of the cantilever spring is a free end.

4. The optical disc apparatus according to claim 1, wherein each of the protrusion and the cantilever spring is provided at a position opposed to a widthwise center of the side surface of the top case.

* * * * *